United States Patent Office.

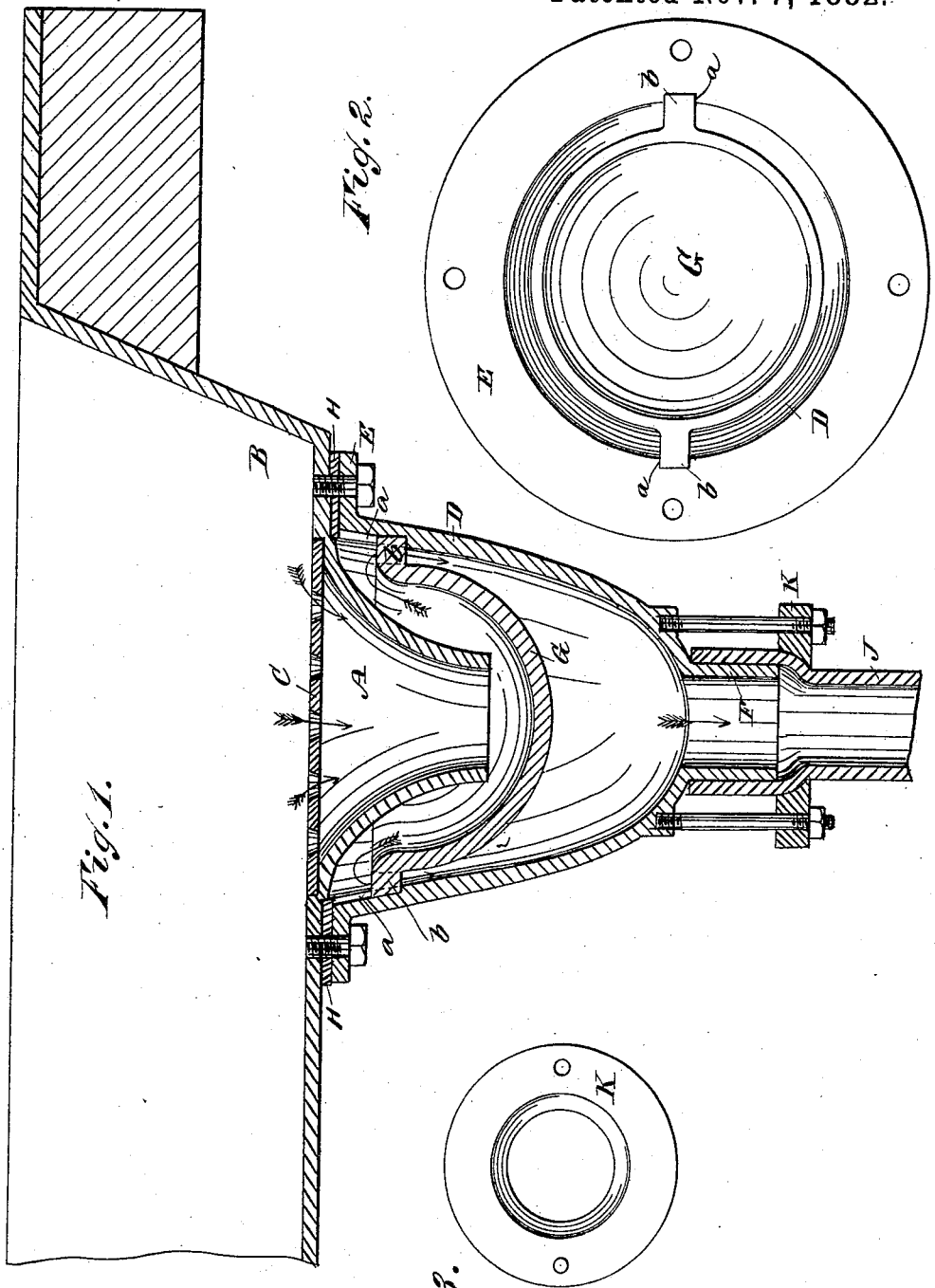

JOHN G. SCHILL, OF HOBOKEN, NEW JERSEY.

FUNNEL-TRAP FOR SINKS.

SPECIFICATION forming part of Letters Patent No. 267,264, dated November 7, 1882.

Application filed March 2, 1882. (No model.)

*To all whom it may concern:*

Be it known that I, JOHN G. SCHILL, of Hoboken, in the county of Hudson and State of New Jersey, have invented a new and Improved Funnel-Trap for Sinks, of which the following is a full, clear, and exact description.

The object of my invention is to provide a new and improved trap for preventing sewer-gases from escaping from the waste-pipe of a sink into the room.

The invention consists in the combination, with a sink, of a funnel projecting from the bottom of the same, a funnel provided at its inner surface with recesses, and a cup provided with lugs fitting in the recesses of the funnel, as hereinafter fully described.

Reference is to be had to the accompanying drawings, forming part of this specification, in which similar letters of reference indicate corresponding parts in all the figures.

Figure 1 is a cross-sectional elevation of my improved funnel-trap for sinks, showing it attached to a sink. Fig. 2 is a plan view of the lower funnel and cup, showing them removed from the sink. Fig. 3 is a plan view of the beveled ring for holding the waste-pipe to the lower end of the funnel.

A short funnel, A, is cast integral with the bottom of the sink B, this funnel projecting downward from the bottom of the sink, and being open at its wider upper end and at its narrow lower end. A removable strainer, C, of the usual construction, fits into the upper end of the funnel, and can be secured by any of the well-known devices. A cup-shaped vessel or funnel, D, provided at its upper end with an outwardly-projecting flange, E, and at its lower end with a neck, F, is provided in its inner surface with two or more recesses, *a*, or grooves, adapted to receive the lugs *b* at the upper end of a cup-shaped vessel, G, whereby the cup G will be suspended in the funnel D in such a manner that water flowing over the upper edges of the cup G can flow down between the inner surface of the funnel D and the upper edge of the cup G, as indicated by the arrows. The funnel D is secured to the bottom of the sink B by means of bolts and nuts in such a manner that the lower end of the funnel A projects into the cup G, as shown. A packing-strip, H, is placed between the bottom of the sink and the flange E, as shown. The upper end of the waste-pipe J is passed over the neck F of the funnel D, and is held on the same by a beveled ring, K, held in place by nuts and bolts projecting from the bottom of the funnel D. If desired, the funnel D may be cast integral with the sink and the funnel A can be placed into the same; but the construction shown is preferred.

The water passes through the strainer C and the funnel A into the cup G, and when the same is filled the water flows over the edges of this cup into the funnel D. The lower end of the funnel A will thus always be immersed in the water and the gases rising from the waste-pipe J cannot pass through the funnel A into the sink. No water comes in contact with the packing strip H, and the same will remain intact a considerable time.

The above-described trap is much cheaper than an S-trap, and can be cleaned very easily. If any sediment collects in the cup G, the same is stirred up by means of a stick passed through the funnel A, and will be washed off by the water passing through the funnel.

The above-described trap can be attached to sinks, wash-basins, cesspools, &c.

Having thus fully described my invention, I claim as new and desire to secure by Letters Patent—

The combination, with the sink B, of the funnel A, projecting from the bottom of the same, the funnel D, provided at its inner surface with recesses *a*, and the cup G, held within the funnel D and provided with lugs *b*, substantially as herein shown and described, and for the purpose set forth.

JOHN G. SCHILL.

Witnesses:
OSCAR F. GUNZ,
C. SEDGWICK.